(12) United States Patent
Goss et al.

(10) Patent No.: US 8,417,904 B2
(45) Date of Patent: Apr. 9, 2013

(54) GARBAGE COLLECTION MANAGEMENT IN A DATA STORAGE DEVICE

(75) Inventors: Ryan James Goss, Lakeville, MN (US); Mark Allen Gaertner, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 501 days.

(21) Appl. No.: 12/725,755

(22) Filed: Mar. 17, 2010

(65) Prior Publication Data

US 2011/0231623 A1  Sep. 22, 2011

(51) Int. Cl.
*G06F 12/00* (2006.01)
*G06F 12/02* (2006.01)
*G06F 12/12* (2006.01)

(52) U.S. Cl. . 711/159; 711/170; 711/171; 711/E12.001; 711/E12.009; 711/E12.069

(58) Field of Classification Search .................. 711/159, 711/170, 171, E12.001, E12.009, E12.069
See application file for complete search history.

(56) References Cited

U.S. PATENT DOCUMENTS

| | | |
|---|---|---|
| 6,567,905 B2 | 5/2003 | Otis |
| 6,681,306 B1 | 1/2004 | Kessler et al. |
| 6,763,440 B1 | 7/2004 | Traversat et al. |
| 7,337,201 B1 | 2/2008 | Yellin et al. |
| 7,395,258 B2 | 7/2008 | Altinel et al. |
| 2008/0155184 A1 | 6/2008 | Gorobets et al. |

*Primary Examiner* — Yong Choe
(74) *Attorney, Agent, or Firm* — Hall Estill Attorneys at Law

(57) ABSTRACT

Method and apparatus for handling data in a data storage device. In accordance with some embodiments, a memory space with a plurality of garbage collection units (GCUs) that are each arranged into pages of memory that store user data identified by logical addresses (LAs) and each GCU has a metadata region that stores metadata that correlates the LAs with physical addresses (PAs). A header region in each page of memory stores a bitmask and a sequence map of the LAs in each page that are used by a log manager to creates a bitmask table stored in a first cache and a hierarchical log stored in a second cache. The bitmask table and hierarchical log are used to determine when the LAs stored in the selected GCU are stale, and update the bitmask for each page in the selected GCU after the stale data has been erased.

20 Claims, 8 Drawing Sheets

GARBAGE COLLECTION MANAGEMENT IN A DATA STORAGE DEVICE

SUMMARY

Various embodiments of the present invention are generally directed to a method and apparatus for handling data in a data storage device. In accordance with some embodiments, a memory space with a plurality of garbage collection units (GCUs) that are each arranged into pages of memory that store user data identified by logical addresses (LAs) and each GCU has a metadata region that stores metadata that correlates the LAs with physical addresses (PAs). A header region in each page of memory stores a bitmask and a sequence map of the LAs in each page that are used by a log manager to creates a bitmask table stored in a first cache and a hierarchical log stored in a second cache. The bitmask table and hierarchical log are used to determine when the LAs stored in the selected GCU are stale, and update the bitmask for each page in the selected GCU after the stale data has been erased. These and other features and advantages which characterize the various embodiments of the present invention can be understood in view of the following detailed discussion and the accompanying drawings.

DETAILED DESCRIPTION

The present disclosure relates to data handling systems, and in particular to devices and methods that may be used to efficiently manage data in a data storage device.

Data storage devices generally operate to store blocks of data in memory. The devices can employ data management systems to track the physical locations of the blocks so that the blocks can be subsequently retrieved responsive to a read request for the stored data. Some types of data storage devices, such as solid state drives (SSDs), can be arranged to write data to a new available location each time a block is presented for writing. Over time, a situation may arise where several versions of a given block may persist in memory, with one of the versions being the most current data and the remaining versions being older, stale data.

Metadata can be generated and maintained to track the locations and status of the stored data. Such metadata tracks the relationship between logical elements (such as logical addresses, LAs) stored in the memory space and physical locations (such as physical addresses, PAs) of the memory space.

Data management systems often extend considerable effort to maintain the metadata in an up-to-date and accurate condition, since the metadata are used to retrieve data responsive to host data requests. Such considerable effort can burden a data management system and result in inefficient use of system resources that limit performance. In some cases, metadata is extensively mapped in order to determine the physical location of stale data.

In accordance with exemplary embodiments, system management can be improved by minimizing the number of metadata operations through monitoring various portions of a memory space for stale data in real-time by maintaining mapping structures in separate memories or caches that can direct portions of memory that contain a large percentage of stale data to be erased and made available for new data.

In some embodiments, the descriptor data include header data at both a GCU (garbage collection unit) level and at a page level. The descriptor data may further employ a bitmask with status bits that indicate the status (valid or stale) of each stored LA. The descriptor data can be stored in a variety of suitable locations. In this way, a storage device can map and monitor different versions of data stored throughout a memory space in real-time without accessing various metadata in order to determine if portions of the memory contain mostly stale data that can be erased to make more memory available for new data.

Figure 1:
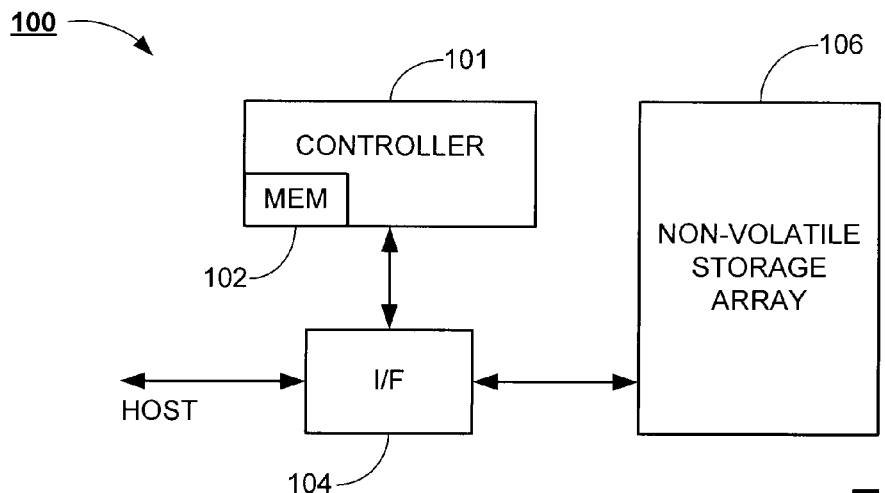
FIG. 1 provides a functional block representation of a data storage device constructed and operated in accordance with various embodiments of the present invention.

Turning to FIG. 1, a functional block representation of an exemplary data storage device 100 is provided. While not limiting, for purposes of the present discussion it will be contemplated that the device 100 is characterized as a solid-state drive (SSD) that utilizes Flash memory cells arranged in a NAND configuration.

The device 100 includes a top level controller 102, an interface (I/F) circuit 104 and a non-volatile data storage array 106. The I/F circuit 104 operates under the direction of the controller 102 to transfer user data between the array 106 and a host device (not shown). In some embodiments, the controller 102 is a programmable microcontroller. Data can be buffered in the I/F circuit 104 pending a transfer of the data between the array 106 and the host device.

Figure 2A:
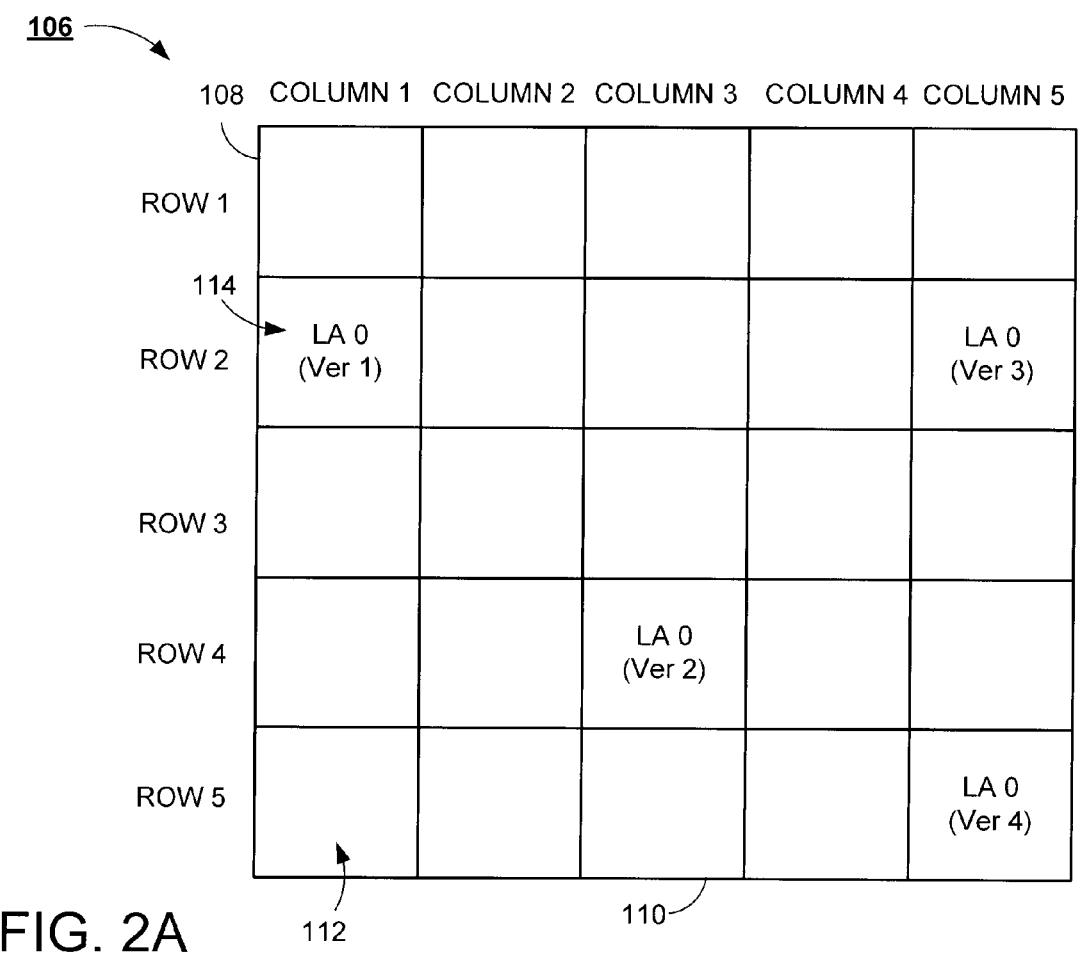
FIGS. 2A and 2B shows a functional block representation of a portion of the memory array of the device of FIG. 1.

FIG. 2A provides a functional representation of portions of the non-volatile storage array 106 of FIG. 1. A number of non-volatile memory cells are arranged in rows 108 and columns 110 of memory and to allow the transfer of data between the array 106 and the I/F 104 (FIG. 1). As shown, the non-volatile memory cells can be grouped so that a block of memory 112 is accessible at the intersection of every row 108 and column 110. In various embodiments, each block of memory 112 is arranged into multiple pages of memory that each shares a common source control line.

The blocks 112 may be erasure blocks, that is, the smallest increment of memory subjected to an erase operation at a given time. Each column 110 in FIG. 2 may represent a different plane, chip, memory layer, etc. so logical proximity in FIG. 2A does not necessarily imply physical proximity.

In some embodiments, data are supplied from the host in fixed size sectors, such as 512 bytes. Each sector may have an associated logical address (LA) which allows unique identification of the block at the host level. Such LAs can comprise, but are not limited to, objects, system files, metadata, and other data storage layouts. The blocks of data are stored at an associated physical address (PA) in the array. Due to a variety of factors including data compression, encoding, encryption, etc., the actual number of bits stored in the associated PA in the array may vary from one address (LA) to the next. Because the LAs are written sequentially to the next available location, a particular LA may have a PA that spans certain boundaries, such as from one page to the next in a given block 112. Metadata are generated and stored to provide the requisite logical-to-physical locality to convert LA information to the associated PA information for each LA stored by the array.

In an exemplary operation of the non-volatile storage array 106, data is written to all or part of a first location 114. Such location will have a PA that identifies the actual physical position in the memory space and a corresponding LA that identifies the particular stored data to allow a host to access the data. Over time, stored data can become stale when updates to the data maintain the same LA but contain different information. Such updated data can be written to the same block of memory 112 and by overwriting the data stored at the first location 114. However, a number of negative effects can result from such overwriting including, but not limited to, degradation of individual bits of memory and failure to properly store data.

Figure 2B:
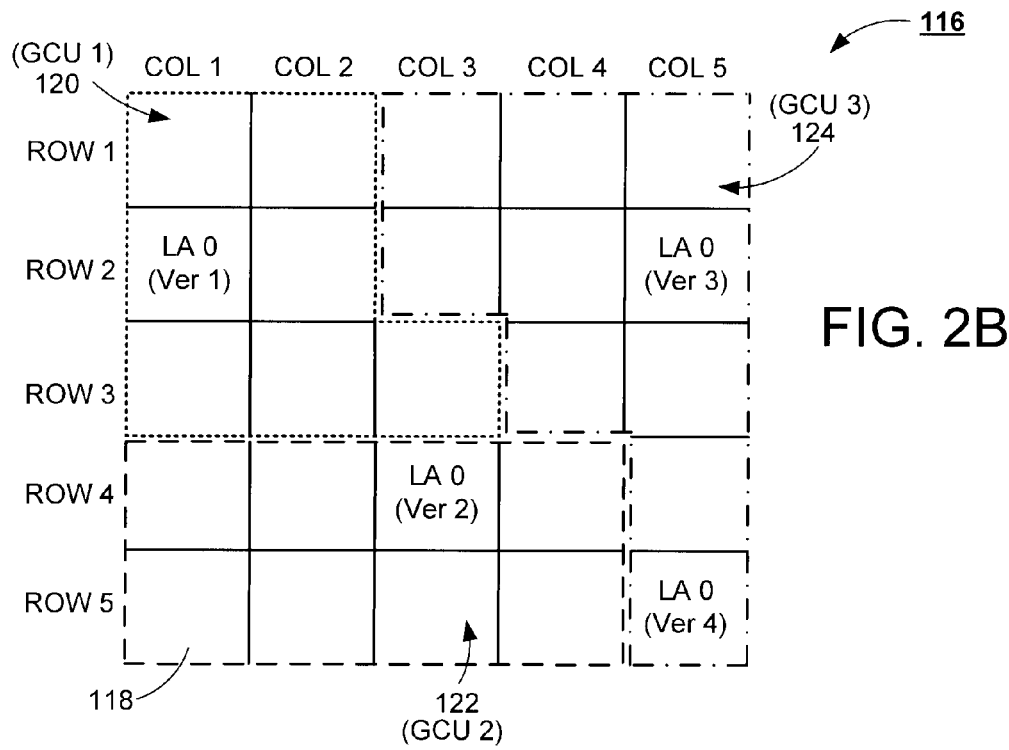

FIG. 2B shows the array 116 of FIG. 2A arranged into a number of manageable regions referred to as garbage collection units (GCUs). The GCUs can be arranged as a single block 112, multiple blocks, or any other suitable grouping of the array. Three exemplary GCUs are shown at 120, 122 and 124 (GCUs 1-3). Each GCU is managed as one or more pages that for writing and reading as well as block that perform erasure operations. As such, a GCU can have multiple operations, such as reading and erasing, concurrently occurring on different portions of the GCU. The GCUs are allocated in turn to store data from a host. For example, GCU 1 may be allocated first and filled with stored data prior to allocation of GCU 2, and GCU 3 may be allocated once GCU 2 is filled.

While not necessarily required, it is contemplated that new data will be written to the next available page location in the most recently allocated GCU. When the GCUs comprise multiple blocks 112, a separate tracking mechanism can be provided to indicate the internal sequence for filling the individual blocks 112; that is, all 128 pages of data for a first erasure block 112 will be filled prior to writing data to the first page of a second erasure block, etc.

A selected LA (LA 0) is shown in FIG. 2B to have been successively stored in different locations of the array. A first version of LA 0 is stored in GCU 120, a second, updated version is stored in GCU 122, and third and fourth updated versions are stored in GCU 124. Version 4 represents the current version of data and versions 1-3 represent stale data. While under some circumstances it may be appropriate to return an older version of data to the host (such as during a special archive retrieval event), under normal circumstances only the current version of data will be returned responsive to a host read request. Ideally, the metadata associated with the GCUs correctly identifies Version 4 as the most current version.

It should be noted that a block of memory 118 can be any size, span multiple rows and columns, and include any number of bits and pages of memory. Such configurations can be used to provide manageable units 120 that are evaluated and maintained as a GCU. While a GCU can be configured as a single page or block of memory 118, the GCU can also consist of multiple blocks 118 which the GCU can manage by writing, erasing, and evaluating data on one or more portions of the unit 118 to provide efficient management of the memory array 116.

Figure 3:
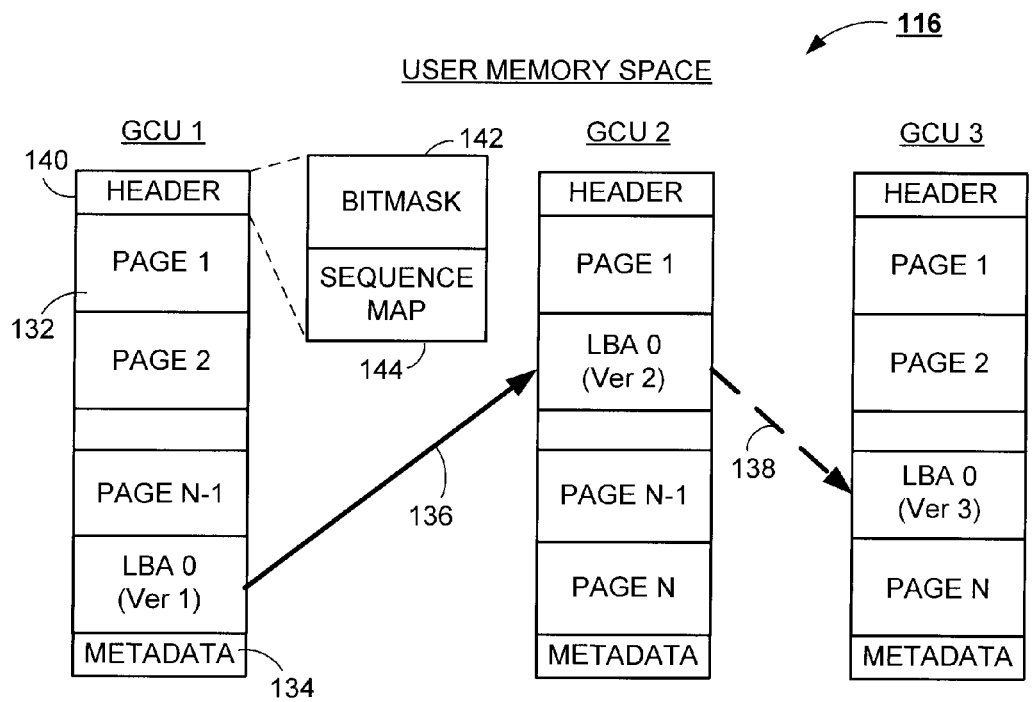
FIG. 3 display a functional block representation of a portion of the memory array of FIGS. 2 and 2A.

FIG. 3 generally illustrates a block representation of portions of the memory array 116 of FIGS. 2A and 2B. GCUs 1-3 are provided having a plurality of pages of memory 132. It should be noted that the various units can be any size and comprise any number of pages 132 and amounts of memory. For example, each block 112 of FIG. 2A can be characterized as a GCU, as can a plurality of blocks that extend across multiple rows and columns of memory.

In some embodiments, each GCU 1-3 can be configured to have a metadata region 134 where unit management information is stored as metadata. The metadata can be accessed from the array each time the associated GCU is accessed, or the metadata can be loaded to a volatile memory during system initialization for local access by the controller. While the metadata region 134 is shown to be appended to the end of the GCU, it will be appreciated that the metadata can be stored in any suitable location, including being appended to each page 132 in turn.

While the information stored as metadata is not limited, the metadata can store all the necessary operational information for the memory array 116 to uniquely locate a physical location for a particular LA. Furthermore, a number of metadata formats can be used, including forward pointers that identify the address of a later version of a given LA.

As shown, a first version of LA 0 is stored in GCU 1, a second version is stored in GCU 2, and a third and fourth versions are stored in GCU 3, with the fourth version being the most current. The metadata is designed to provide forward pointers 136, 138 which direct the system to the physical of the most current version. If a metadata failure results in the inability to properly decode the second forward pointer 142, the system may incorrectly identify the second version in GCU 2 as the most current version and return this data to the host.

In various exemplary embodiments, a data storage device, such as the device 100 of FIG. 1, reads and updates the metadata corresponding to portions of the memory space to correlate assigned LAs with the actual PA as well as direct the controller to updated versions of the LA located in other portions of the memory space. In this way, the metadata can be read every time there is a host request from the memory space to provide information necessary to locate various aspects of a memory space such as, but not limited to, firmware, defects, and user data.

However, consultation of the metadata for each GCU can burden system processing and resources as the total number of updates for each LA increases over time. It has been observed that memory arrays allocate a majority of system resources to host access operations that read and update metadata as LAs are updated throughout a memory space. Specifically, the identification and elimination of out-of-date (stale) data from various GCUs can consume vast amounts of system resources due to the need for mapping and updating metadata to direct a host to the most recent version of each LA present in each GCU. Hence, such extensive metadata management can result in inefficient system operation with increased potential for errors.

Accordingly, a header region 140 can be allocated in each GCU to store descriptor data that allows a controller to identify the presence of stale data in a GCU without accessing a forward pointer metadata map. That is, descriptor data stored in the header region of each GCU can allow a host to monitor if data stored in a selected GCU is stale in real time without having to map the various versions of each LA stored in the selected GCU through access to the metadata.

It should be noted that the header region 140 does not require a supplemental read or write operation by a controller to detect the presence of stale data. That is, the header region 140 is read and written every time a selected GCU is read or written which results real-time monitoring of the data in each GCU without mapping the various versions of each LA to determine if the most recent version is in the selected GCU. Therefore, real-time monitoring of the data in a GCU can be undertaken by a controller during routine read and write operations without supplemental routines that could occupy system time and resources.

Moreover, the header region 140 can be updated whenever a GCU is written, so that the descriptor data is more current than the corresponding metadata and thus provide a more precise data monitoring. However, the updating of the descriptor data in the header region 150 is not limited to each time a GCU is written and can be various times, either scheduled or manual, as desired. Likewise, analysis of the data in a GCU is not limited to a particular time and can be modified to accommodate a variety of individual and redundant occurrences.

In some embodiments, the header region 140 is configured as one or more pages of user data at the beginning of a GCU that stores a bitmask 142 and a sequence map 144. While the bitmask 142 and sequence map 144 are not limited, the information can completely describe the logical elements stored in each page. Such information can be considered a "reverse bitmask" and a "reverse sequence map" because it provides a correlation of a physical location in each GCU to an LA. In contrast, the metadata can provide a "forward map" that correlates LAs to physical locations. Such distinctions between the "forward" and "reverse" correlations indicate which LAs are stored within a GCU, without consultation of the metadata.

In operation, the GCU descriptor data can be referenced to identify the sequence in which currently active GCUs were allocated for the storage of user data. The sequence map field 142 can comprise data that indicates when the GCU was last written, such as a time stamp, as well as which LAs are stored in the GCU. Meanwhile, the GCU descriptor data, such as the bitmask field 144, can also reference which LAs stored in the GCU are stale. That is, the descriptor data can indicate to a host system what LAs are stored in the GCU and which of those LAs are stale.

In the example of FIG. 3, the sequence map 142 can occupy 18 bits while the bitmask 144 can be provided as 47 bits for a total of 65 bits. These bits can occupy the first row of the GCU, with page 0 occupying the remainder of this row. Other suitable locations can be alternatively used. If multiple GCUs are concurrently available, the GCUs can be arranged into a ready queue and the sequence number will differentiate which GCU was utilized first. Each GCU remains active until filled with stored data, after which a next available GCU is allocated for use.

Figure 4:
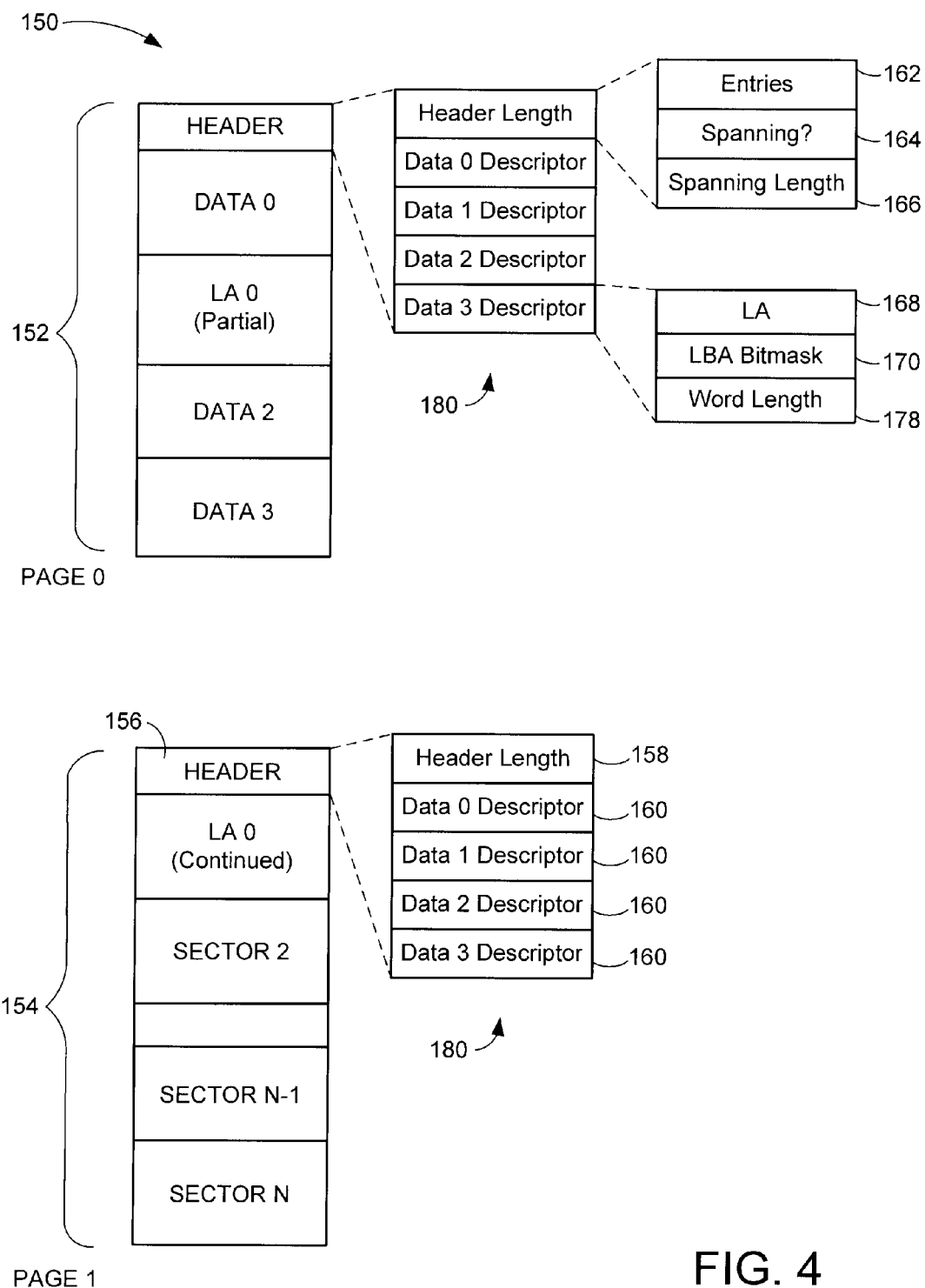
FIG. 4 shows an exemplary block representation of the portion of the memory array of FIG. 3 in accordance with various embodiments of the present invention.

FIG. 4 further exemplifies page level descriptor data in accordance with various embodiments of the present invention. In at least some embodiments, the page descriptor data are appended to every physical page in the array, and serve to describe every LA stored to that page. As illustrated, a memory space 150 includes first and second pages 152, 154 (Page 0 and Page 1). Bits are allocated at the beginning of each page to establish a page header region 156. Each page header region 156 stores the page descriptor data for that page in a variety of fields including a header length descriptor 158 and a number of data descriptor fields 160.

The header length descriptor 158 identifies the total number of entries (e.g., LAs) stored to the associated page in an entries field 162. A spanning field 164 indicates whether the last LA spans the page boundary to the next page, as represented for DATA 3 in FIG. 4. A spanning length field 166 indicates the total number of spanned bits for the partial LA (e.g., how many bits of the spanned LA appear in the following page). In some embodiments, the entries field 162 uses seven (7) bits, the spanning field 164 uses one (1) bit, and the length field 166 uses ten (10) bits, for a total length of 18 bits.

Each of the individual data descriptor fields 160 are associated with an individual LA stored to the associated page. While formats can vary, the exemplary format in FIG. 4 includes an LA identifier field 168 (29 bits), an LA bitmask 170 (8 bits), and a word length field 182 (10 bits) for a total of 47 bits. With reference to the second half of the spanned LA 3 in FIG. 4, no duplicate entry is necessarily required in the header for the second page 154 since the information relating to this LA is fully represented in the entry for this LA in the first page 152.

It is contemplated that write data will be accumulated and written a page at a time, so that the page descriptor data can be generated and written during the writing of the associated LAs. If less than a complete page of data are written, filler bits can be appended to fill the page, and the next write operation will commence with the next available page in the GCU.

The page header fields 180 (FIG. 4) provide information on every LA at the page level, and the GCU header fields 140 (FIG. 3) provide information with regard to the order in which the GCUs were written. If two or more versions of the same LA are present in a GCU, a version of the LA at a higher (later in time) page address of the GCU supersedes the version of the LA at a lower (earlier in time) page address. However, in some embodiments, the temporal order with the GCU is determined with other operations, such as, but not limited to mathematical functions and table look-ups.

As such, these elements can be combined and used to monitor the various GCUs in real-time and identify when a large percentage of LAs in a particular GCU are stale and can be garbage collected to make free space available for new data.

Figure 5:
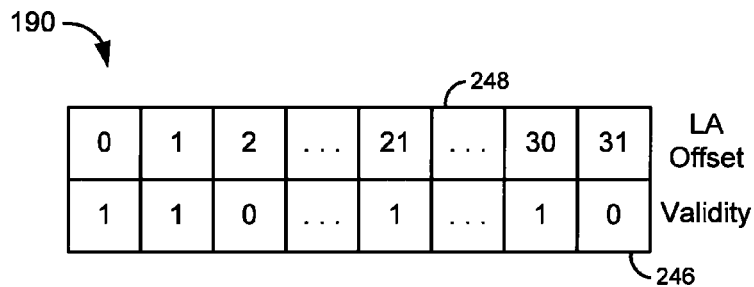
FIG. 5 displays an exemplary portion of the memory array of FIG. 3 in accordance with various embodiments of the present invention.

FIG. 5 generally illustrates an exemplary bitmask 190 that marks LAs within a page and GCU as stale. When an LA is written to a physical location, a validity bit 192 is set to an appropriate value such as one, indicated that the LA at that PA is the most current version. At the same time, the previous physical location that contains a stale version of the LA has a corresponding validity bit programmed to an appropriate value such as logical zero to indicate that LA version is now out of date.

A variety of bit indicators can be used including multi-bit indicators. For example, the bit value "10" can be used to denote a current LA and "00" can be used to indicate a stale LA. In some memories such as Flash, writes may only be performed in a single direction (e.g., from a 1 to a 0), and require an erasure to reset the value (from 0 back to 1). Thus, if the bitmask is maintained and updated in non-volatile memory, the setting of a particular bit in the bitmask to indicate a current LA status may not necessarily require an actual write event to change the state of an associated memory cell. That is, LAs may be cleared without first erasing by having a "1" to "0" bit value transition after originally writing a particular bit.

During a read request for a selected LA, the forward pointer(s) of the metadata can be followed in an effort to identify the physical location (PA) of the most current version of the LA. The physical address can be used as the look-up address to form an LA offset value 248 that can then either be stored in a table, or will be determined from the descriptor data. If the validity bit for the requested LA offset if programmed to zero, an error is detected and can be reported to the host.

As a result, the bitmask may be used to determine if the metadata properly provides the most current location of the LA because only the most recent copy will have the validity bit set to one (or whatever other value is used to identify current data). As such, the bitmask can provide further verification confidence due to the fact that out of all of the PAs that store different versions of the same LA, only a single PA will have a current validity bit as directed by the descriptor data.

It can be appreciated that the marking of an LA can refer to either a single LA or a group of LAs to form a large logical data group. Such larger data groups can be used to effectively minimize the size of a bitmask table. The bitmask can also be used as further verification that all of the data in a selected GCU are stale, so that the GCU can be safely erased and reallocated.

With each page and GCU having a sequence map and bitmask, a new version of a selected LAs must be updated in each bitmask that has the selected LA. As large amounts of data updates compile over time, the system resources needed to update each bitmask would continually grow and burden the efficiency of the system due in part to the fact that direct overwrites of bitmask validity bits does not occur. Moreover, numerous metadata accesses would be necessary to map all the occurrences of the selected LA throughout the memory space.

Accordingly, the maintenance of a bitmask table in a separate memory space, such as a first cache, can allow for real-time monitoring of the validity of each LA stored in a memory space. An exemplary bitmask table 200 is provided in FIG. 6 in accordance with various embodiments of the present invention. A number of entries 202 are organized into first and second pages 204 and 206 that are in also grouped into a first block 208. It should be noted that the number of pages in the bitmask is a function of its capacity and can include more than two pages. While the number and size of entries, pages, and blocks are not limited, in some embodiments, each entry stores 32 bits while each page comprises 1024 entries and each block contains 256 pages.

Figure 6:
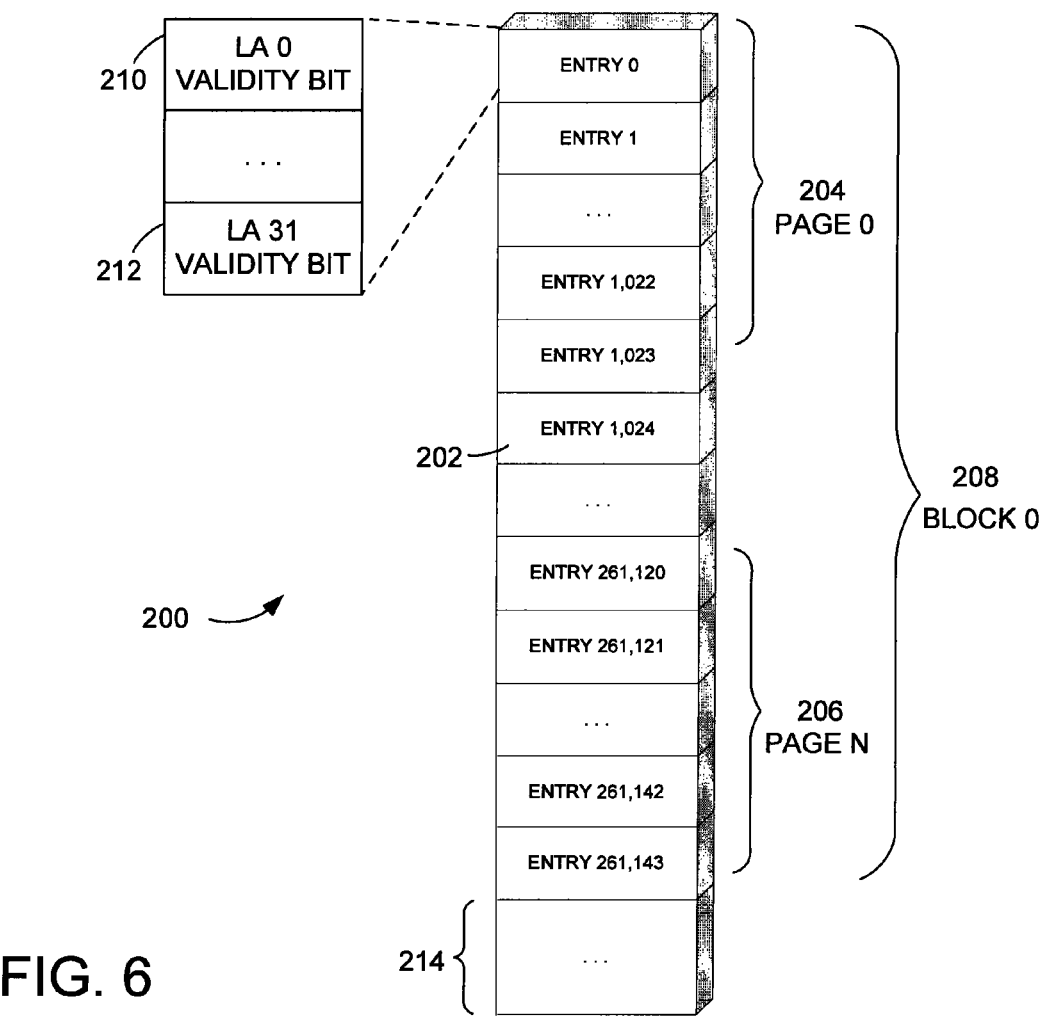
FIG. 6 illustrates an exemplary block representation of a portion of a memory space in accordance with various embodiments of the present invention.

Each entry 202 of the bitmask table 200 can configured to store multiple validity bits for a variety of LAs, as illustrated in FIG. 6. For example, an entry may have a logical one bit stored in the first entry that corresponds to a first LA 210 while a different logical state is stored in the first entry that corresponds to a second LA 212.

Further in some embodiments, the bitmask table 200 is stored in a non-volatile cache memory, such as flash memory to which approximately 0.1% of the overall capacity of the memory is allocated for metadata 214 that indicates the LAs corresponding to each entry 202. With the LA information stored in the metadata 214, the bitmask table 200 can quickly identify which pages and blocks of each GCU in memory that contain mostly stale data and can be garbage collected to free up new space.

The correlation of the bitmask entries 202 to the individual pages of memory in the memory space can further allow the bitmask table 200 to indicate the physical location of all the versions of a selected LA in combination with the location of the most recent version of the selected LA. The placement of the bitmask table 200 in a separate cache memory can allow for updates to the various entries to be less time and processing intensive than if each full page of user data would have to be rewritten.

While the entire bitmask table can be updated to accommodate new versions of LAs, updating tables that correspond to large user data memory spaces (>1 TB) can be time and resource intensive. Thus, a hierarchical log, as shown in FIG. 7 can be stored in a separate memory space that is smaller than the memory space storing the bitmask table 200 while allowing real-time monitoring of LAs in the user data memory space and efficient updates of bitmask table 200.

Figure 7:
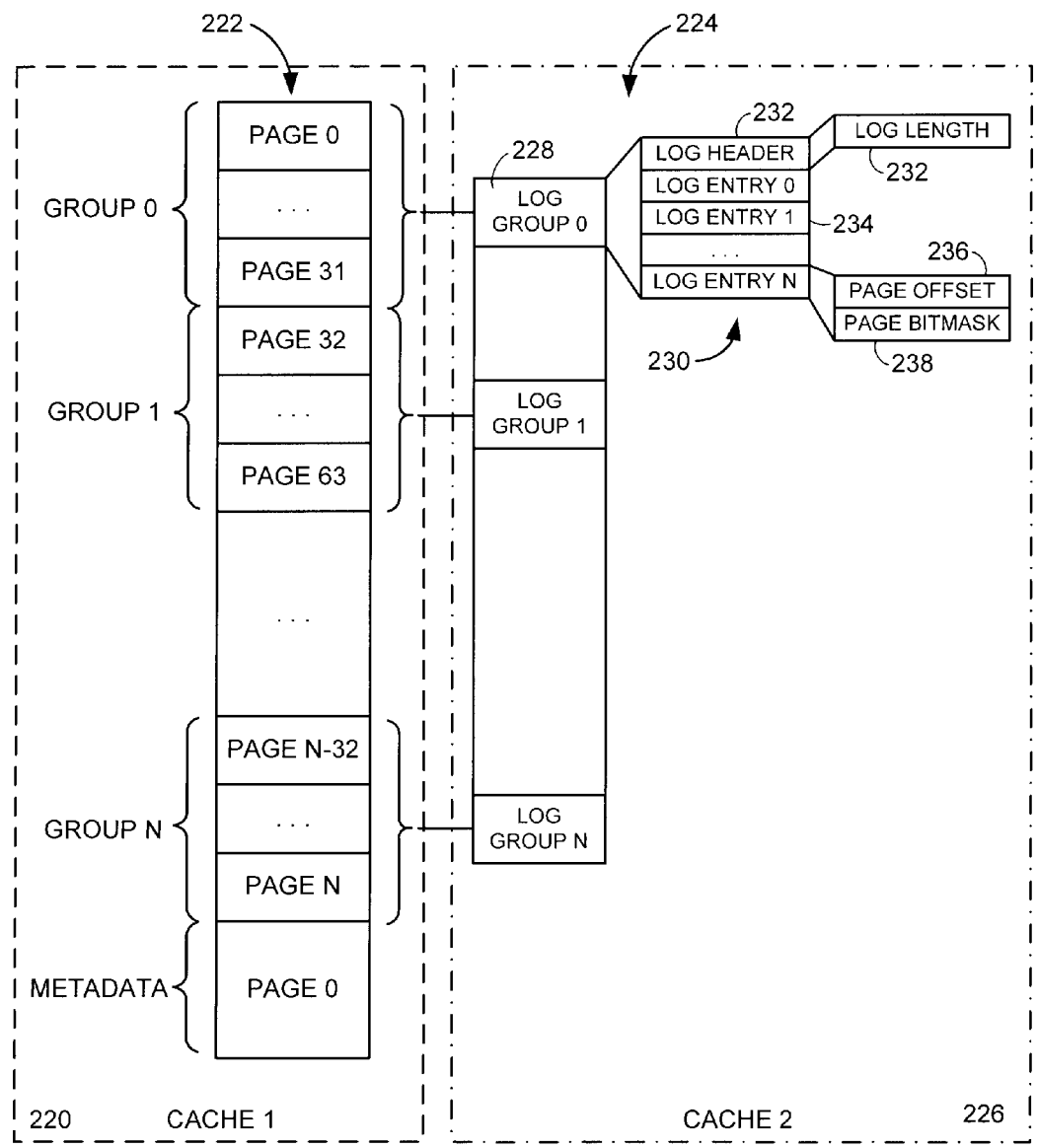
FIG. 7 shows an exemplary block representation of portions of a memory space.

FIG. 7 generally illustrates an exemplary portion of a data storage device that can be used to efficiently monitor various portions of a memory space and identify when data in particular portions are stale and can be recycled. In a first cache 220, a bitmask table 222, such as the table of FIG. 6, is stored and monitors both stale and current data corresponding with various LAs. A hierarchical log 224 is stored in a second cache 226 and is linked to the bitmask table 222 to provide real-time updates of the various versions of the LAs stored in a third memory space (not shown) that includes the actual user data.

While not limiting, the hierarchical log 224 can comprise a number of groups 228 that correspond to a predetermined number of pages in the bitmask table 222. As illustrated, a single log group 228 can correspond with 32 pages of the bitmask table 222 and monitor whether any of the pages in the group 228 is stale. That is, a log group 228 can monitor and identify when a page of the bitmask table 222 is stale by storing a predetermined logical value (logical "1" or "0") to indicate when a page contains only stale data.

Each log group 228 can be configured with a log data 230 that can comprise a header field 232 that stores at least log length information 232 that indicates how many log entries 234 are stored in the log group 228. Each log entry 234 can be configured to store data in a page offset field 236 that specifies the location of a page in the bitmask table 222. The log entry 234 can further store a page bitmask 238 that stores the logical value that indicates whether the page of data in the bitmask table is current.

The configuration of the hierarchical log 224 into groups of pages from the bitmask table 222 allows a smaller size second cache 226 due to the storage of a logical value for each page as opposed to the bitmask table 222 that stores a logical value for each entry or bit of user data. For example, each log entry 234 can monitor whether a page from the bitmask table 222 contains only stale data with 47 bits per page, 15 bits for the address/offset of the various pages in the bitmask table 222 and 32 bits to store the logical values indicating if current data is present. In an extension of the example, when 32,768 entries of user data become stale, the bitmask table 222 stores 131 Kbytes of information while the hierarchical log 224 would store 188 bits for the same number of entries of user data.

It can be appreciated that the size and configuration of the hierarchical log 224 is not limited and can be modified, as desired, to accommodate any cache size and bitmask precision. Furthermore, the first and second caches 220 and 226 are not restricted to a certain size, location, or type. In a specific exemplary configuration, the first cache is a flash memory with 1 Gbyte of storage capacity while the second cache is a non-volatile memory with 32 MBytes of storage capacity. However, such sizes are contemplated for 1 TByte of user data and can be modified, as needed.

As such, the hierarchical log 224 allows for the identification of the presence of stale data that can be deleted so that the memory space can be erased and programmed with new data.

The hierarchical structure of the log 224 further allows for a large number of user data entries to be monitored for stale data with small amounts of data. In addition, the hierarchical log 224 can be used to locate sections of user data that are stale by linking the log group 230 that provides a location of stale data in the bitmask table group that further identifies the entry that finally identifies the specific bit of user data that is stale. With such a reverse sequence look-up, a controller can locate the physical location of stale data with a variety of precisions.

Invariably as data is updated throughout the user memory space, the hierarchical log 224, bitmask table 222, and individual page of user data need to be updates as well. However, the lack of a direct overwrite capability in most solid state memories can burden the system by requiring a rewriting of large portions of the memory space or caches at a time. Thus, management of a hierarchical log that is full of data, both current and stale, can pose system performance issues if not handled efficiently.

Figure 8A:
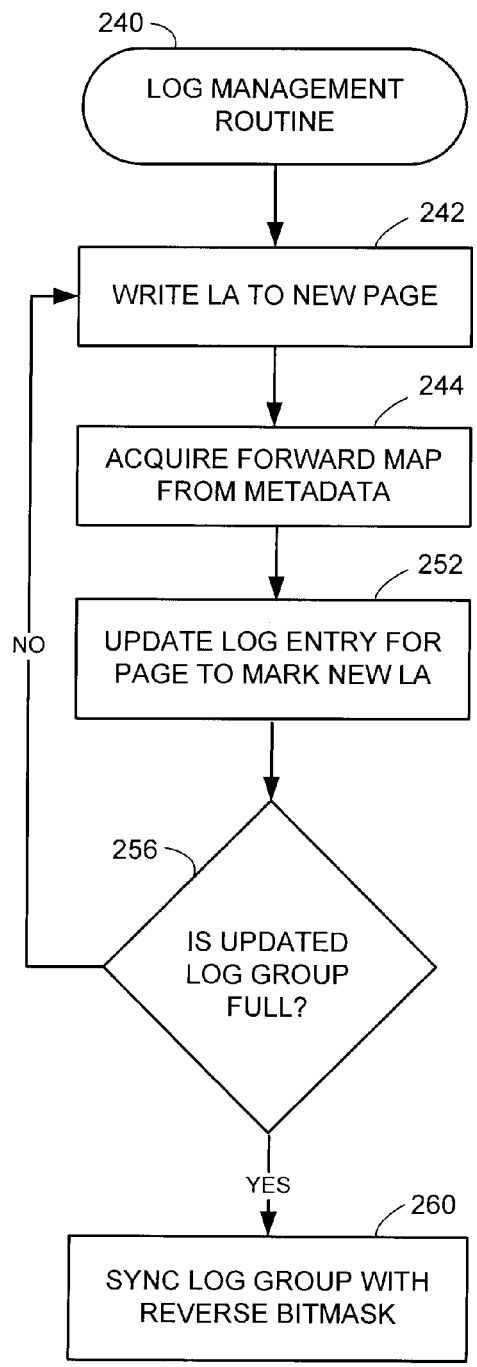
FIGS. 8A and 8B provide an exemplary log management routine and associated general illustration of portions of the memory space of FIG. 7.
Figure 8B:
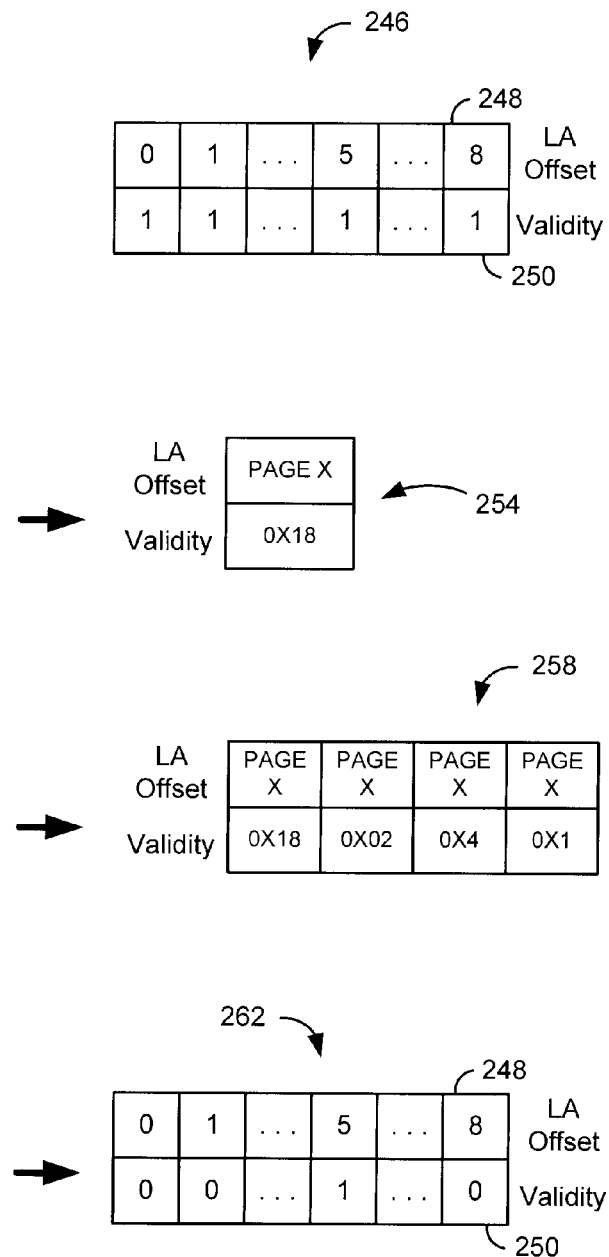

FIGS. 8A and 8B provide an exemplary log management routine 240 that effectively handles updating of user data. The routine 240 initially has an update to an LA written to a new page in step 242. While the updating of data is not restricted to a new page and can be written in any region of the user memory space, the bitmask data indicating that the prior location contains current data needs to be updated. With the writing of a new location in memory, it is contemplated that metadata associated with the previous and new locations are updated to direct a controller to the most recent version of the LA.

In step 244, the metadata of the user memory space is consulted to acquire a map of forward pointers that provide the page and LA offset of the updated information. With the location of the new user data, the controller can identify which portions of the bitmask table and hierarchical log need to be updated. An exemplary bitmask 246 comprising LA offsets 248 and corresponding logical values 250 is provided in FIG. 8B. The location of the new user data in the hierarchical log is then updated in step 252 after consulting the bitmask table to identify which log group the new data is stored. As an example, a portion of the hierarchical log 254 is displayed in FIG. 8B with the updated data for the entire bitmask table page. In some embodiments, the updates to the log can be written in hexadecimal values, as shown.

The routine 240 continues to decision 256 which evaluates whether the updated log group is full of updated data. It should be noted that updated data for a number of different log pages can be stored in the updated log group and in any portion of the second cache or a separate memory space, such as a third volatile memory space. If the updated log group is not full, the routine 240 returns to step 242 and awaits new data to be written to a user memory space. However, if the updated log group is full, as illustrated in by the log group 258 of FIG. 8B, step 260 syncs the updated log group with the bitmask table to implement the updated information at free the updated log group for future data updates.

With the erasure of portions of user data when garbage collection operations are conducted, the updated log group can be discarded due to the fact that the corresponding locations in the user memory space have been recycled and contain no data, either current or stale. Such garbage collection operations can decrease write amplification to the bitmask table of the first cache by eliminating the need to update the bitmask table until data is present in the newly recycled portion of the user memory space.

Functionally, the log management routine 240 and hierarchical log provide efficient updates to the bitmask table due to the ability to stored update information in the log that is present in a smaller physical memory space and requires less system resources to update the entire space, as required by most solid state drives. Hence, the hierarchical log can be updated more efficiently than either the user memory space or the larger bitmask table while providing real-time monitoring an identification of portions of memory that are stale.

Figure 9:
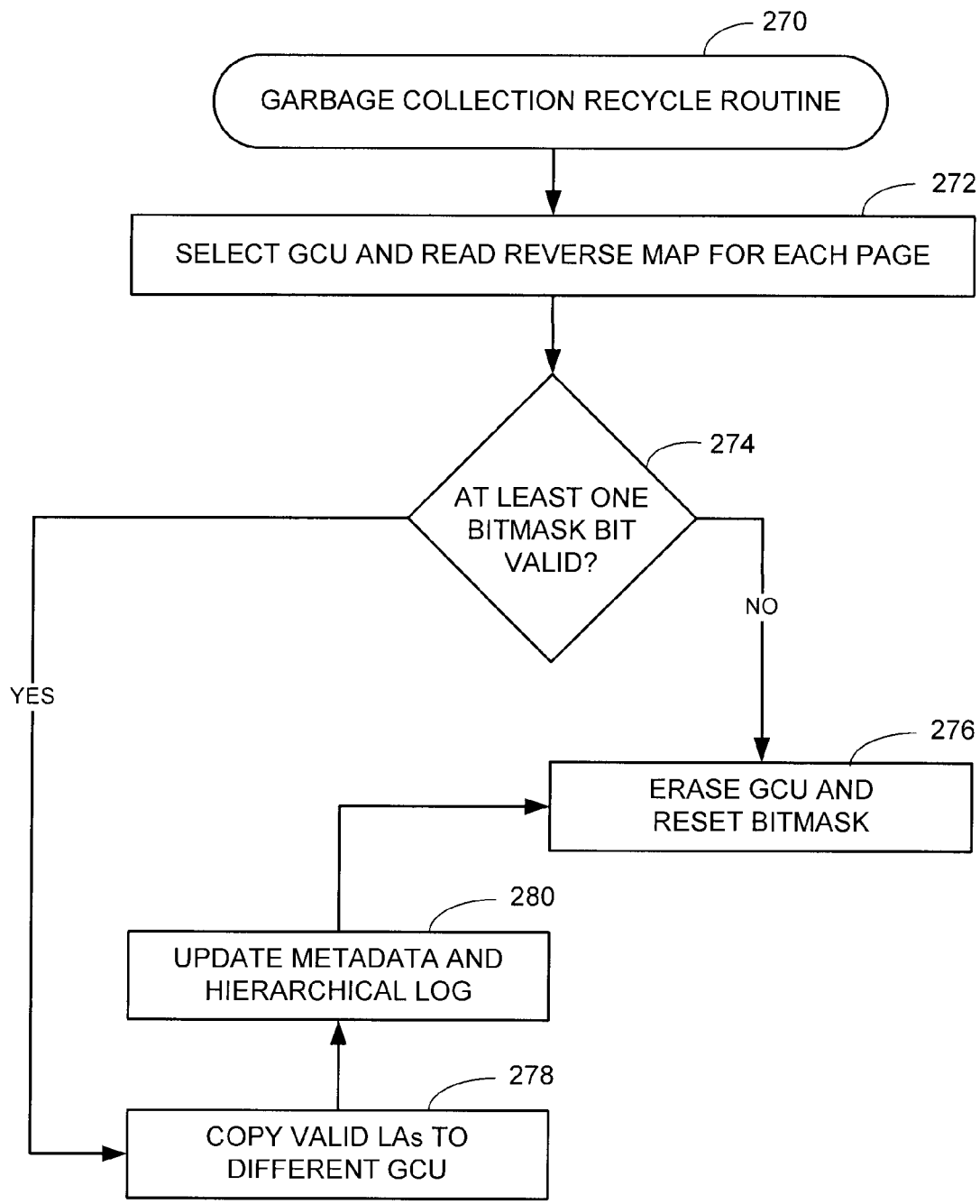
FIG. 9 generally illustrates flow chart for an exemplary garbage collection recycle routine generally illustrative of steps carried out in accordance with various embodiments of the present invention.

FIG. 9 generally provides an exemplary flow diagram of a garbage collection recycle routine 270 that can be implemented with step 260 of FIG. 8. Upon either the indication of a full updated log group or host initiation, a controller can conduct garbage collection duties on the physical locations in the user memory space that contain some or all stale data. Step 272 selects a GCU of user data and compiles a reverse map for each page by reading the various metadata and following the forward pointers to the most recent version of each LA stored in the GCU. Decision 274 determines if at least one valid bitmask value indicating the presence of current data is registered for the selected GCU. It should be noted that step 272 and decision 274 can be replaced through consultation of either the bitmask table or hierarchical log, depending on the precision desired.

Without any current data in the selected GCU, the routine 270 proceeds to step 276 in which the GCU is erased and the bitmask for each page in the GCU is reset to receive new data. However, if current data is present in the selected GCU, the current data can be copied to a different GCU in step 278 while the metadata and hierarchical log are updated either concurrently or sequentially in step 280. With the selected GCU containing only stale data, the routine 270 can proceed to step 276 and erase the GCU and prepare for the reception of new data.

Figure 10:
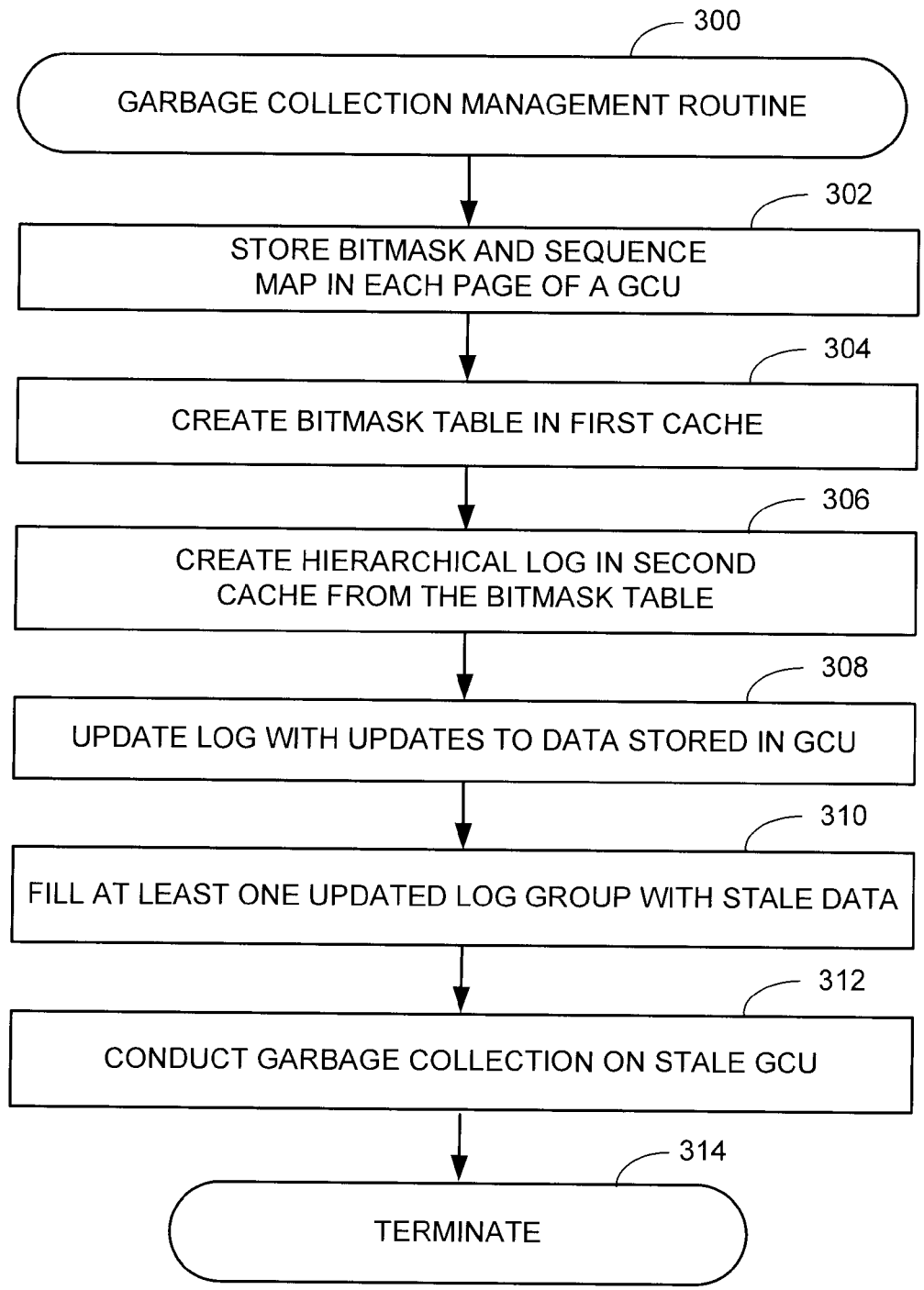
FIG. 10 provides a flow chart for an exemplary garbage collection management routine generally illustrative of steps carried out in accordance with various embodiments of the present invention.

As a result, a controller can recycle portions of the user memory space and reduce the complexity involved with maintaining multiple versions of stale data. The implementation of such GCU operations is further generally described in an exemplary garbage collection management routine 300, as illustrated in FIG. 10. While the routine 300 can be conducted from the beginning of the operation life of a data storage device, such timing is not required as the routine can be implemented at any time. The routine beings at step 302 which stores a bitmask and a sequence map in each page of a GCU as data is written to a user memory space. As discussed above, the bitmask and sequence map can provide a host with information about each of the LAs stored in the corresponding page without consultation with the metadata.

Step 304 proceeds to create a bitmask table in a first cache that condenses the bitmask values for each user data page into entries that are organized into bitmask table pages that monitors and identifies if an entry contains stale data. The bitmask table pages are further condensed into log groups of a hierarchical log in step 306 that is stored in a second cache. The hierarchical log allows monitoring of large portions of user data, such as a GCU, in a cache that has a physical size which is conducive to efficient updating of data without burdening system resources.

With a bitmask table and hierarchical log present in separate caches, step 308 updates the hierarchical log as user data is updated to the user memory space. As an updated log group fills in step 310 with updated bitmask data corresponding to the location of the most current version of LA stored in a GCU, garbage collection operations, such as the routine 270 of FIG. 9, are conducted on the GCU containing stale user data. The routine can terminate at step 314 after a GCU is recycled, but may also continue to update the hierarchical log and conduct garbage collection operations until manually terminated by a host.

As such, storage of a bitmask and a sequence map for each page in a user memory space can allow the compilation of the bitmask table and hierarchical log which conducts real-time monitoring for stale data which can be recycled to provide new available memory. Such real-time monitoring can further eliminate the potentially burdensome operations of mapping the various versions of every LA stored in a GCU to identify if stale data is present. As a result, garbage collection operations can be scheduled and conducted without querying the metadata of the user memory space. Furthermore, the structure of the hierarchical log and bitmask table can allow for efficient stale data monitoring while updating the physical location of the most current versions of each LA.

It will be appreciated that the various embodiments discussed herein have numerous potential applications and are not limited to a certain field of electronic media or type of data storage devices. For purposes herein, the references to rows and columns will be read broadly as relational identifiers in an ordered array of elements along different axes without constituting a specific physical layout. Thus for example, the term "row" may constitute a physical column without deterring from the spirit of the present invention.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
a memory space with a plurality of garbage collection units (GCUs) each arranged into pages of one or more data storage elements that store user data identified by logical addresses (LAs), each GCU having a metadata region, that stores metadata that correlates the LAs with physical addresses (PAs); and
a log manager that creates a bitmask table stored in a first cache and a hierarchical log stored in a second cache to determine when the LAs stored in the selected GCU are stale, and updates the bitmask table for each page in the selected GCU after the stale data has been erased.

2. The apparatus of claim 1, further comprising a header region in each page of memory that stores a bitmask and a sequence map of the LAs in each page.

3. The apparatus of claim 2, wherein the bitmask comprises a logical value indicating whether the LA stored in the selected GCU is the most current version of that LA in the memory space.

4. The apparatus of claim 2, wherein the sequence map comprises an offset value that indicates the physical location of each LA in the selected GCU.

5. The apparatus of claim 2, wherein the bitmask and sequence map of each page identifies both valid PA that are the most current version of the LA and invalid PA which are stale LA.

6. The apparatus of claim 1, wherein the hierarchical log is full of updated bitmask data that corresponds to multiple separate GCUs and initiates a single garbage collection operation that recycles multiple GCU simultaneously.

7. The apparatus of claim 1, wherein the bitmask table is rewritten with updated bitmask data from the hierarchical log in response to the hierarchical log tilling with a predetermined amount of updated bitmask data.

8. The apparatus of claim 1, wherein the hierarchical log is stores an offset value and a bitmask logical value that correspond to a plurality of bitmask pages that form a log group.

9. The apparatus of claim 1, wherein a GCU is considered stale when a predetermined ratio of valid to stale LAs is met.

10. The apparatus of claim 1, wherein the bitmask table is initially programmed with values that can be cleared without a previous page erase operation.

11. A method comprising:
providing a memory space with a plurality of garbage collection units (GCUs) each arranged into pages of memory that store user data identified by logical addresses (LAs), each GCU having a metadata region that stores metadata that correlates the LAs with physical addresses (PAs);
storing a bitmask and a sequence map of the LAs in each page in a header region of each page; and
creating a bitmask table stored in a first cache from the bitmask of the pages of a selected GCU and a hierarchical log stored in a second cache a log manager to determine when the LAs stored in the selected GCU are stale, and update the bitmask for each page in the selected GCU after the stale data has been erased.

12. The method of claim 11, wherein the metadata is queried to update the hierarchical log but not queried when garbage collection operations are initiated for the selected GCU.

13. The method of claim 11, wherein upon identification of at least one valid bitmask value for the selected GCU, valid LAs are relocated to separate GCUs.

14. The method of claim 13, wherein garbage collection operations erase the selected GCU after the valid LAs are relocated.

15. The method of claim 11, wherein the bitmask for each page in the selected GCU is updated by setting all the logical values to zero.

16. The method of claim 11, wherein garbage collection operations are conducted without updating the bitmask table.

17. The method of claim 11, wherein the selected GCU is erased in response to having less than all the data in the GCU being stale.

18. A method comprising:
providing a memory space with a plurality of garbage collection units (GCUs) each arranged into pages of memory that store user data identified by logical addresses (LAs), each GCU having a metadata region that stores metadata that correlates the LAs with physical addresses (PAs);
storing a bitmask and a sequence map of the LAs in each page in a header region of each page;
creating a bitmask table stored in a first cache from the bitmask of the pages of a selected GCU and a hierarchical log stored in a second cache a log manager to determine when the LAs stored in the selected GCU are stale, and update the bitmask for each page in the selected GCU after the stale data has been erased; and
initiating garbage collection operations in response to the hierarchical log being full of updated bitmask data.

19. The method of claim 18, wherein garbage collection operations erase the selected GCU without querying the metadata.

20. The method of claim 18, wherein the hierarchical log is full of updated bitmask data that corresponds to different GCUs than the selected GCU.

* * * * *

UNITED STATES PATENT AND TRADEMARK OFFICE
CERTIFICATE OF CORRECTION

PATENT NO. : 8,417,904 B2
APPLICATION NO. : 12/725755
DATED : April 9, 2013
INVENTOR(S) : Ryan James Goss and Mark Allen Gaertner It is certified that error appears in the above-identified patent and that said Letters Patent is hereby corrected as shown below:

In the Claims:

In Col. 11, line 66
replace "tilling"
with "filling."

In Col. 12, line 1
replace "is stores"
with "stores."

Signed and Sealed this
Sixteenth Day of July, 2013

Teresa Stanek Rea
*Acting Director of the United States Patent and Trademark Office*